(12) United States Patent
Asari

(10) Patent No.: US 8,591,681 B2
(45) Date of Patent: Nov. 26, 2013

(54) METHOD FOR PRODUCING COMPOSITE MATERIAL MOLD FOR COMPOSITE MATERIAL LONG MEMBER

(75) Inventor: Kazumi Asari, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 13/424,527

(22) Filed: Mar. 20, 2012

(65) Prior Publication Data
US 2013/0032275 A1 Feb. 7, 2013

(30) Foreign Application Priority Data
Aug. 4, 2011 (JP) .................. 2011-170903

(51) Int. Cl.
*B29C 65/02* (2006.01)

(52) U.S. Cl.
USPC ........... 156/163; 156/182; 156/196; 264/296; 264/250

(58) Field of Classification Search
USPC ......... 156/163, 160, 182, 196, 212, 242, 231; 264/225, 250, 255, 296
See application file for complete search history.

(56) References Cited

U.S. PATENT DOCUMENTS

2005/0140045 A1* 6/2005 Okamoto et al. ............ 264/160
2012/0258276 A1* 10/2012 Modin ........................ 428/98

FOREIGN PATENT DOCUMENTS

| EP | 1 040 901 A1 | 10/2000 |
| EP | 2 186 627 A2 | 5/2010 |
| JP | 64-004315 A | 1/1989 |
| JP | 2005-186558 A | 7/2005 |
| JP | 2009-234046 A | 10/2009 |

OTHER PUBLICATIONS

Partial European Search Report dated Nov. 26, 2012, issued in corresponding European Patent Application No. 12176281.9 (7 pages).

* cited by examiner

*Primary Examiner* — Yogendra Gupta
*Assistant Examiner* — Vishal I Patel
(74) *Attorney, Agent, or Firm* — Westerman, Hattori, Daniels & Adrian, LLP

(57) ABSTRACT

The present invention provides a method for producing a mold made of a composite material by using a prepreg material. First, a material 200 of a mold having a long two-dimensional shape and in a semi-cured state is produced from a prepreg sheet by continuous pultrusion molding. Subsequently, the semi-cured material 200 is mounted on a plurality of templates 131, 132, 133, 134, and 135 vertically provided on a base plate 120 of a molding apparatus 100, and thereby plastically deformed into a three-dimensional shape. The entire molding apparatus 100 is heated and pressurized to produce a completely-cured mold.

1 Claim, 27 Drawing Sheets

530

METHOD FOR PRODUCING COMPOSITE MATERIAL MOLD FOR COMPOSITE MATERIAL LONG MEMBER

The present application is based on and claims priority of Japanese patent application No. 2011-170903 filed on Aug. 4, 2011, the entire contents of which are hereby incorporated by reference.

BACKGROUND OF THE INVENTION

1. Field of the Invention

The present invention relates to a method for producing a mold for use in molding a two-dimensional or three-dimensional long member having a straightness, a curvature, or a twist such as a stringer for aircraft by using a prepreg made of a composite material.

2. Description of the Related Art

Molds for producing a long structural member for aircraft made of a composite material such as carbon fiber are generally produced from metal or a composite material.

When the mold is produced from metal, a master model is produced, and a casting mold is produced using the master model. Molten metal is poured into the casting mold to produce a casting. The casting is then mechanically processed into a require shape or size, or to obtain a required surface roughness. Since the mold needs to be produced through the above complicated processes, the cost for the same increases and a long lead time becomes necessary.

There is also a method of directly performing mechanical processing on a metal block including a required size. However, the material is largely wasted, and it also takes a longer time to process the material. When the mold is made of metal, there is also a problem that the mold is heavier than the mold made of a composite material.

When the mold is produced from a composite material, a following procedure needs to be performed.

An inverted mold corresponding to the mold is produced by mechanical processing. Prepregs for the mold are laminated on the inverted mold, subjected to bagging, and pressurized and heated in an autoclave or the like to be cured.

While the inverted mold is produced from an inorganic porous material such as plaster, or epoxy resin, the materials have low strength and are brittle materials. Thus, a long inverted mold is difficult to handle. The material size is also limited, so that there is an inconvenience that the materials having a cut length need to be bonded together so as to produce a long product.

In autoclave molding, the materials are exposed to a curing temperature of the prepreg. The inorganic porous material such as plaster or the epoxy resin is thereby reduced in strength, and a crack may occur in the inverted mold due to a molding pressure or a thermal stress generated by a difference in linear expansion coefficient.

There is also a production method of performing mechanical processing on a material block in a similar manner to the mold made of metal. However, since a material large enough to include a three-dimensional shape is required, there are problems that the material is wasted, it takes a longer processing time, and when a long member is processed, a long material has low marketability.

A two-dimensional straight mold is produced by a normal continuous pultrusion molding method disclosed in Japanese Patent Laid-Open Publication No. 01-004315 (Patent Document 1).

A mold having a curve or a twist is disclosed in Japanese Patent Laid-Open Publication No. 2005-186558 (Patent Document 2) or No. 2009-234046 (Patent Document 3).

In the related art described above, the inverted mold needs to be produced before the mold is produced in both the cases of the metal mold and the composite material mold, or the material including the size and shape of a molded article is required.

The inverted mold (the casting mold) for the metal mold needs to be produced through the complicated processes. The inverted mold for the composite material mold is less reliable with respect to the strength and the resistance to heat. In both the cases, a period and a cost for producing the mold are increased.

It is an object of the present invention to provide a method for producing a mold made of a composite material for a long member at a low cost in a short period of time without producing an inverted mold and without any need for a material including the size and shape of a molded article.

SUMMARY OF THE INVENTION

To achieve the above object, a method for producing a mold for use in molding a long member according to the present invention includes, as basic means, the steps of: molding a material of a mold having a two-dimensional shape and in a completely-cured state by causing a material obtained by overlapping a required number of prepreg sheets in which a composite material such as carbon fiber is impregnated with thermosetting resin to continuously pass through a hot press and a heat curing oven while applying a tension to the material; forming a joggle portion partially having a different shape in section by laminating a required number of prepreg sheets on a portion of a surface of the completely-cured two-dimensional mold material; and completely curing the mold material where the joggle portion is formed by heating and pressurization.

Also, a method for producing a mold for use in molding a long member according to the present invention may include the steps of: molding a material of a mold having a two-dimensional shape and in a semi-cured state by causing a material obtained by overlapping a required number of prepreg sheets in which a composite material such as carbon fiber is impregnated with thermosetting resin to continuously pass through a hot press and a heat curing oven while applying a tension to the material; plastically deforming the mold material into a three-dimensional shape by mounting the mold material in a semi-cured state on a plurality of templates vertically provided on a base plate of a molding apparatus at an interval; and completely curing the mold material in a semi-cured state by heating and pressurizing the molding apparatus on which the mold material deformed into a three-dimensional shape is mounted.

Moreover, a method for producing a mold for use in molding a long member according to the present invention may include the steps of: molding a material of a mold having a two-dimensional shape and in a semi-cured state by causing a material obtained by overlapping a required number of prepreg sheets in which a composite material such as carbon fiber is impregnated with thermosetting resin to continuously pass through a hot press and a heat curing oven while applying a tension to the material; plastically deforming the mold material into a three-dimensional shape by mounting the mold material in a semi-cured state on a plurality of templates vertically provided on a base plate of a molding apparatus at an interval; completely curing the mold material in a semi-cured state by heating and pressurizing the molding apparatus on which the mold material deformed into a three-dimensional shape is mounted; forming a joggle portion partially having a different shape in section by laminating a required number of prepreg sheets on a portion of a surface of the completely-cured mold material; and completely curing the mold material where the joggle portion is formed by heating and pressurization.

With the present invention, a two-dimensional straight mold and a three-dimensional mold can be produced at a low cost in a short period of time by continuous pultrusion molding without producing an inverted mold.

With respect to a long mold having a length of 10 meters or more, only a mold having a length of about 1 meter is required when the continuous pultrusion molding is employed. Accordingly, initial investment can be reduced.

DETAILED DESCRIPTION OF THE PREFERRED EMBODIMENTS

Figure 1:
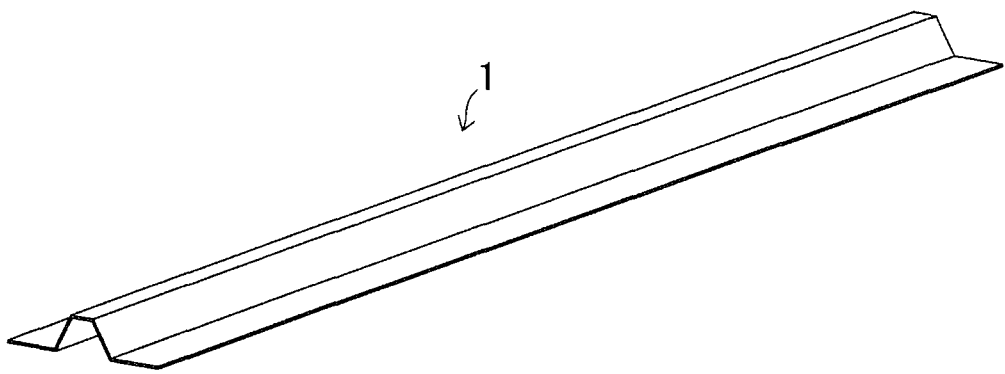
FIG. 1 is an explanatory view illustrating a straight molded article having a two-dimensional shape.
Figure 2:
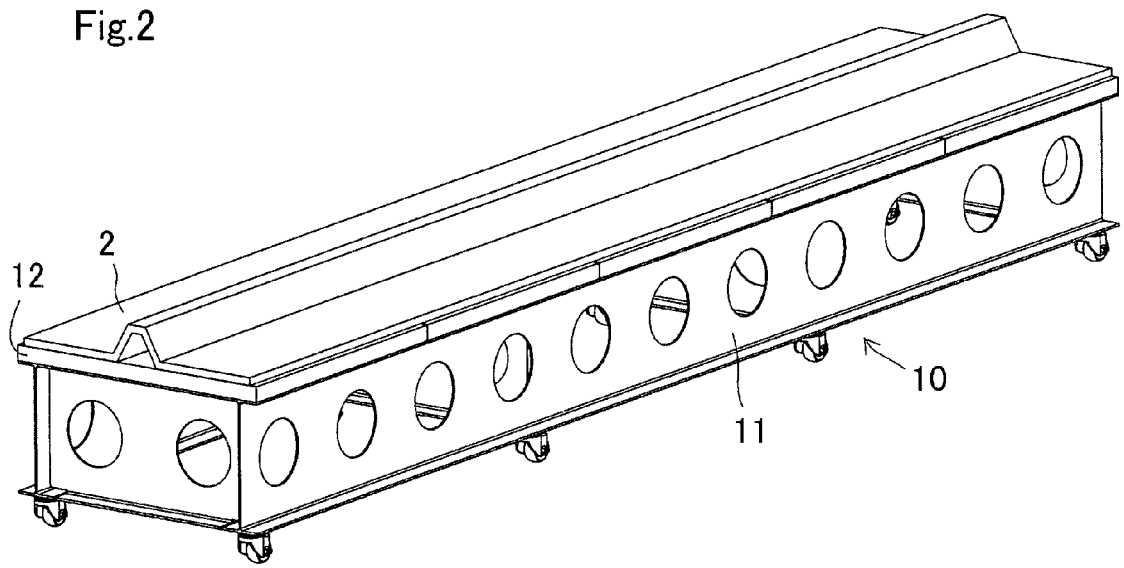
FIG. 2 is an explanatory view illustrating a straight mold having a two-dimensional shape in an application example of the present invention.
Figure 3:
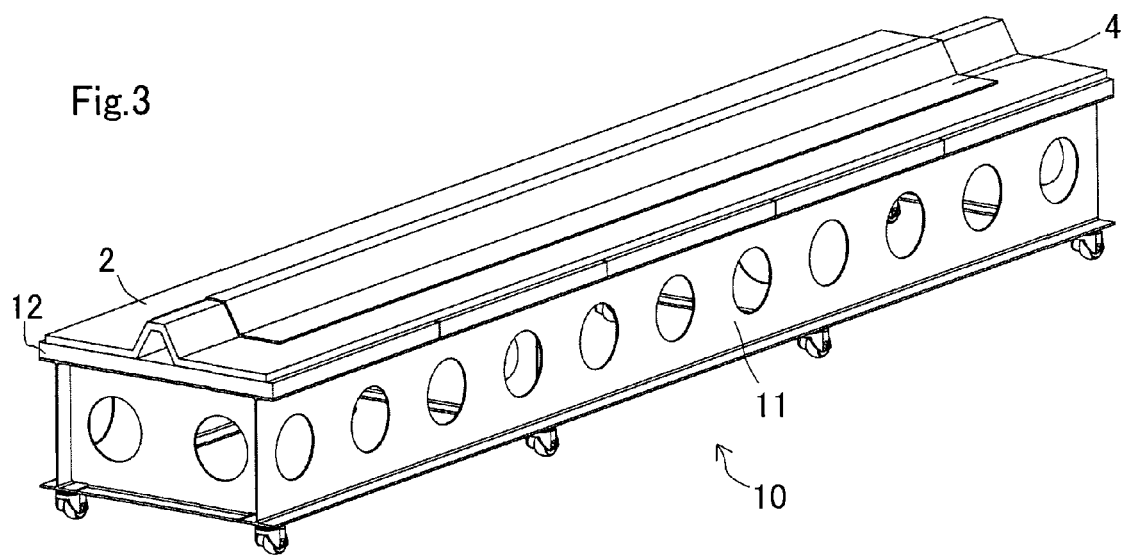
FIG. 3 is an explanatory view illustrating a state in which a prepreg is laminated on the two-dimensional mold.

FIGS. 1, 2, and 3 are explanatory views illustrating an application example of the present invention in which a straight mold having a two-dimensional shape is produced.

First, a material obtained by laminating prepregs is molded into a mold material 2 in a completely-cured state corresponding to a molded article 1 by pultrusion.

A molding apparatus 10 includes a base plate 12 on a stage 11. The mold 2 produced in the above process is mounted on the base plate 12. A required number of prepregs 4 are laminated and laid-up on the mold 2.

After that, the molding apparatus 10 is pressurized and heated in an autoclave or the like to mold the molded article 1 as a product.

Through the above processes, the two-dimensional long molded article 1 made of a composite material can be obtained.

As a method for producing the long molded article 1 having a uniform shape in section along the entire length, a conventional pultrusion method may be also employed without using the two-dimensional mold shown in FIGS. 1 to 3.

FIGS. 4 to 9 show a method for producing a mold for use in producing a long molded article partially having a different shape in section in a longitudinal direction.

Figure 4:
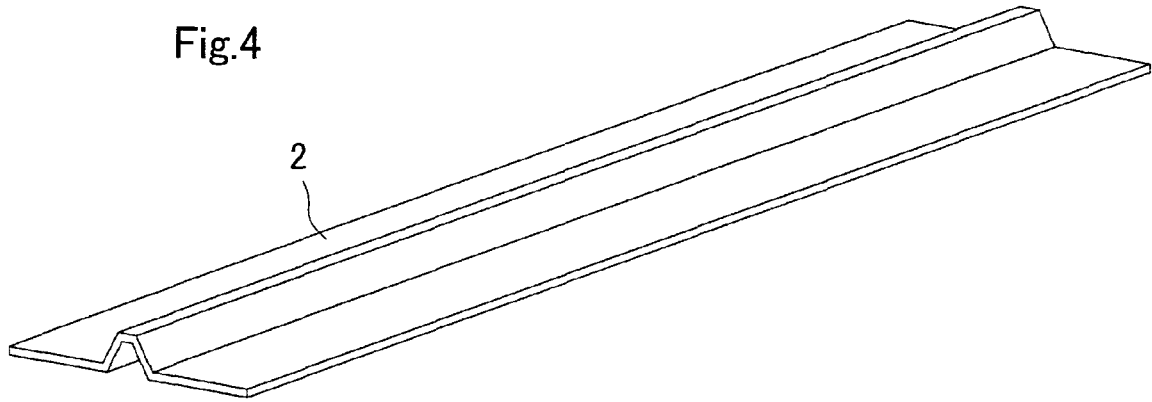
FIG. 4 is an explanatory view illustrating a completely-cured two-dimensional long mold.

In FIG. 4, the completely-cured two-dimensional long mold 2 is produced by the same pultrusion method as that described by reference to FIG. 2.

Figure 5:
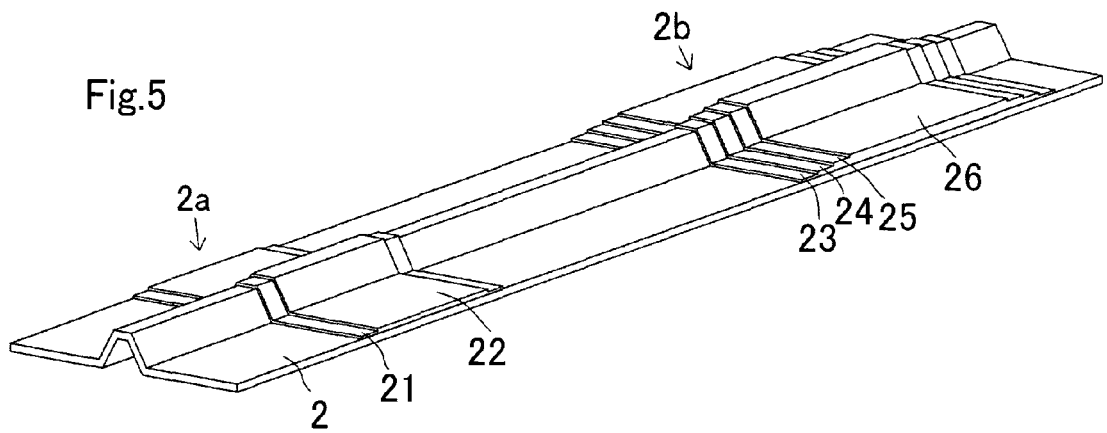
FIG. 5 is an explanatory view of a state in which a joggle portion is laminated on the completely-cured mold.

Subsequently, as shown in FIG. 5, a first joggle portion 2a is formed by laying-up and laminating prepreg sheets 21 and 22 on an upper surface of the completely-cured mold 2. Similarly, a second joggle portion 2b is formed by laying-up and laminating prepreg sheets 23, 24, 25, and 26.

Figure 6:
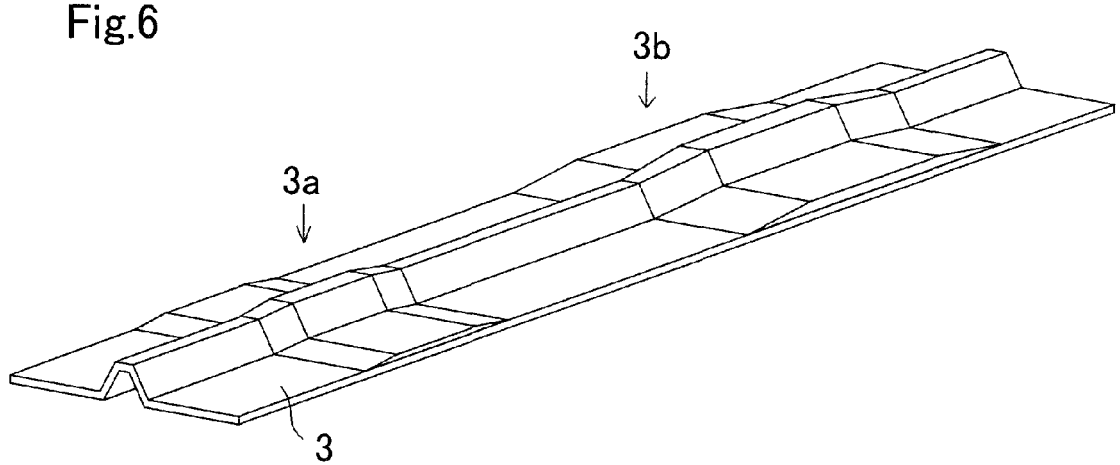
FIG. 6 is an explanatory view illustrating a state in which the mold on which the joggle portion is laminated is completely cured and mechanically processed into a required size and a smooth shape.

Subsequently, the mold 2 having the joggle portions 2a and 2b is heated and pressurized in an autoclave or the like. The mold 2 is thereby completely cured to produce a mold 3 as shown in FIG. 6.

The mold 3 has joggle portions 3a and 3b formed by the lay-up.

Figure 7:
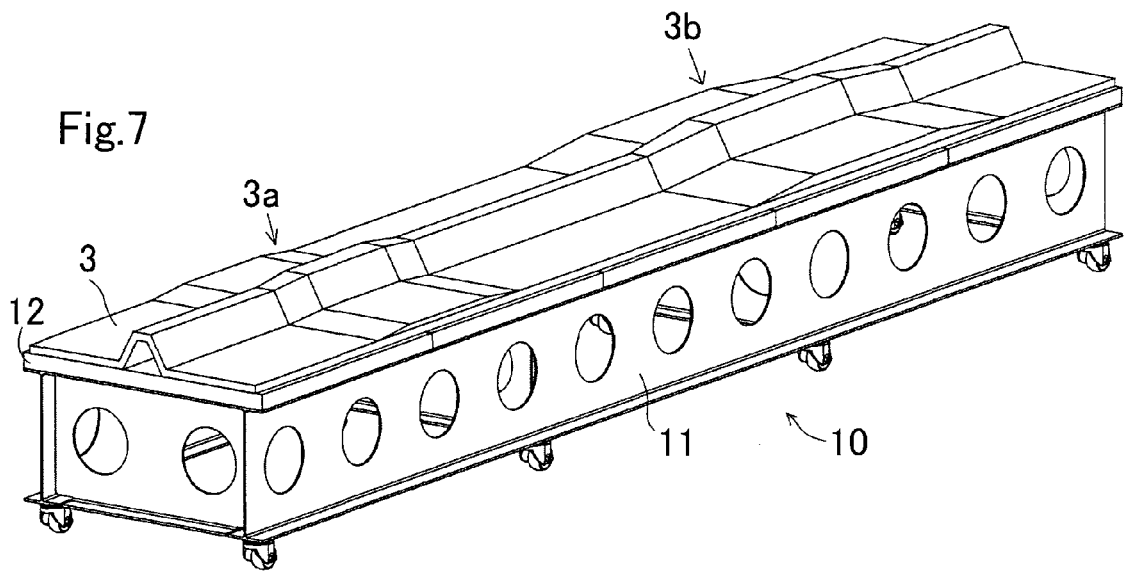
FIG. 7 is an explanatory view illustrating a state in which the mold is mounted on a molding apparatus.
Figure 8:
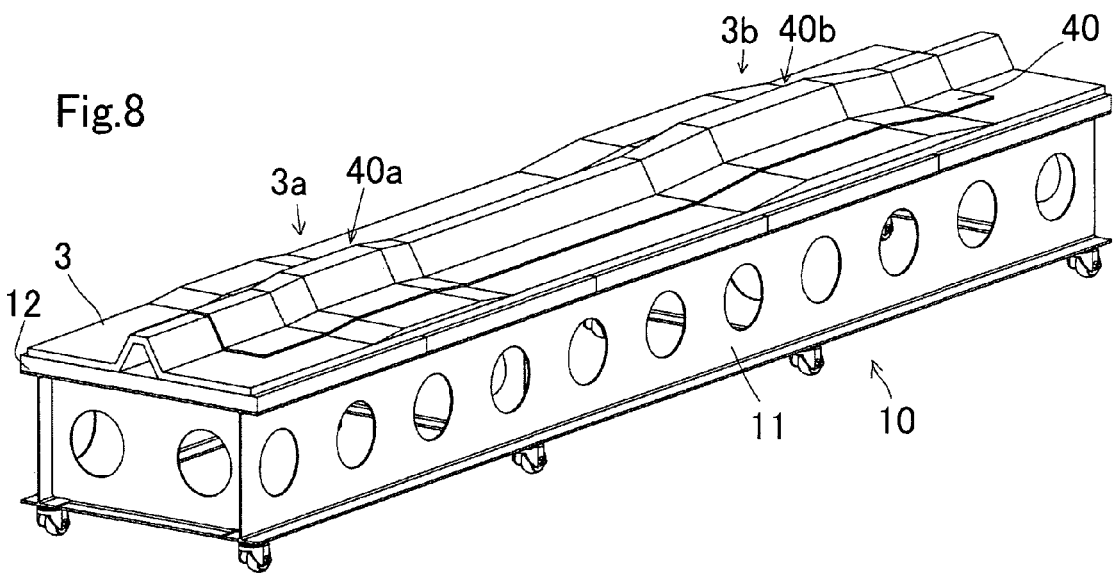
FIG. 8 is an explanatory view illustrating a state in which a prepreg sheet is laminated on an upper surface of the mold.

FIG. 7 shows a state in which the mold 3 produced through the above processes is mounted on the molding apparatus 10. FIG. 8 shows a state in which a prepreg sheet 40 is laid-up on the mold 3 on the molding apparatus 10. Joggle portions 40a and 40b corresponding to the joggle portions 3a and 3b of the mold 3 are transferred to the laid-up prepreg sheet 40.

Figure 9:
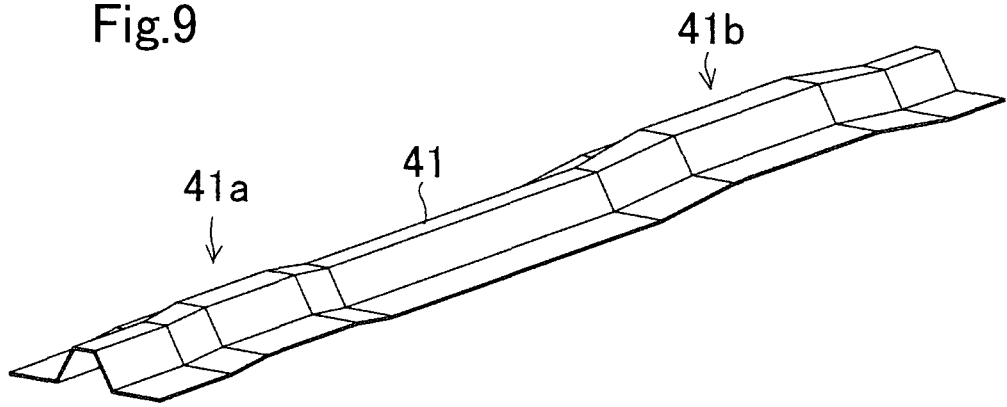
FIG. 9 is a perspective view of a molded article having a joggle portion.

The molding apparatus 10 where the prepreg sheet 40 is laid-up is conveyed to an autoclave, and heated and pressurized at a predetermined temperature and a predetermined pressure. Accordingly, a molded article 41 having joggle portions 41a and 41b can be obtained as shown in FIG. 9.

Next, a method for producing a mold having a three-dimensional shape and made of a composite material will be described by reference to FIGS. 10 to 18.

Figure 10:
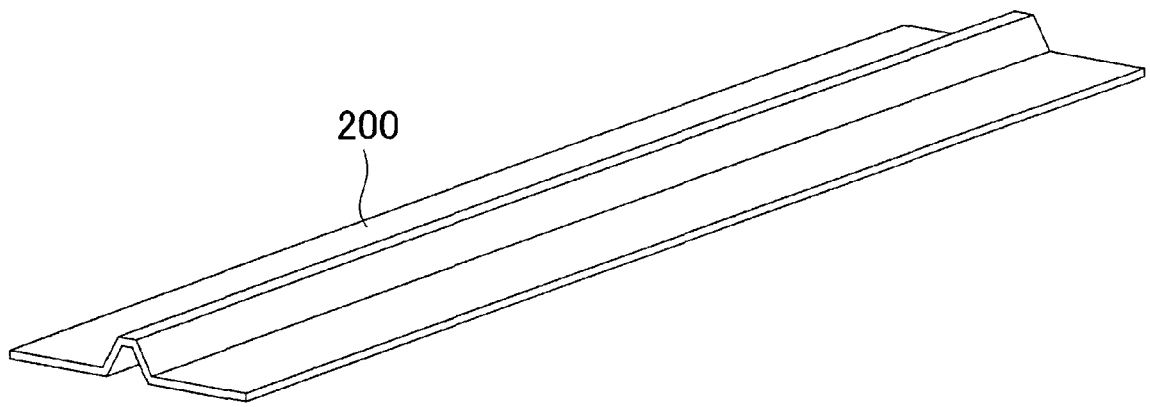
FIG. 10 is an explanatory view of a semi-cured material having a two-dimensional shape as a material of a mold having a three-dimensional shape.

First, a mold material 200 having a two-dimensional shape and in a semi-cured state is produced from a prepreg material by the pultrusion process as shown in FIG. 10. Since the mold material 200 is in a semi-cured state, the mold material 200 can be plastically deformed.

Figure 11:
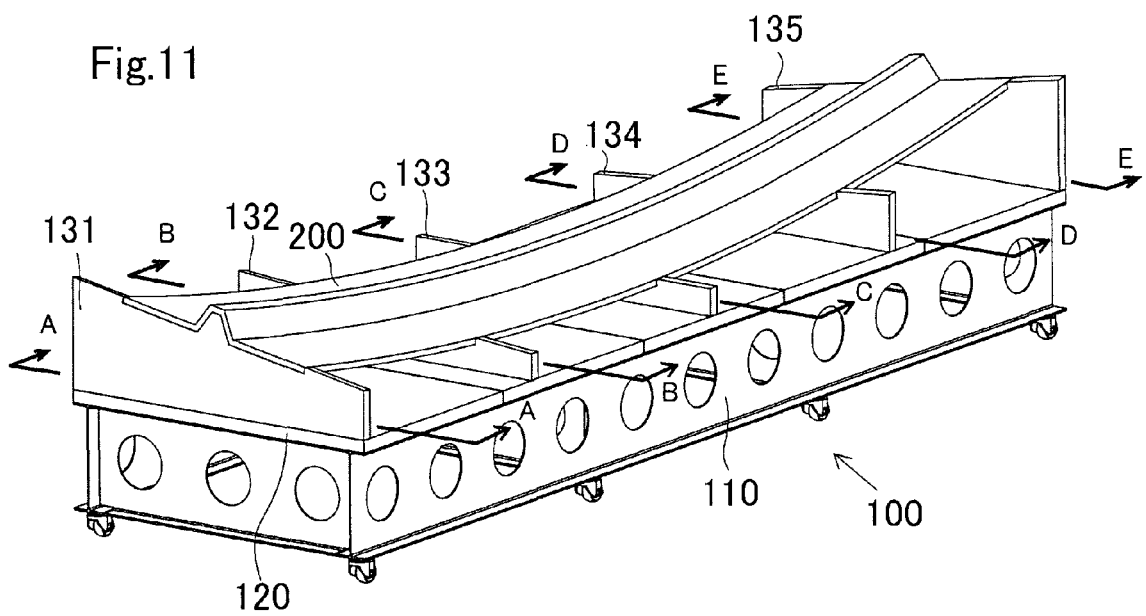
FIG. 11 is an explanatory view illustrating a state in which the semi-cured mold material is mounted on a molding apparatus having three-dimensional templates.

FIG. 11 shows a molding apparatus 100 having a three-dimensional shape.

The molding apparatus 100 includes a base plate 120 on a stage 110. Five templates 131, 132, 133, 134, and 135 are vertically provided on the base plate.

Figure 12:
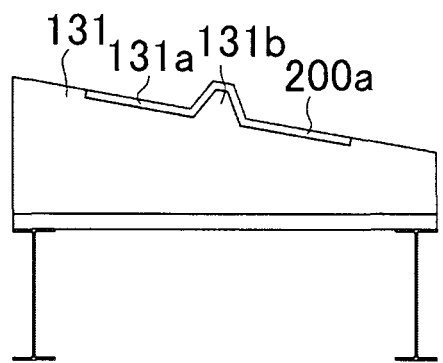
FIG. 12 is an explanatory view of the template.

FIG. 12 shows the shape of the template 131 taken along a section A-A in FIG. 11. The template 131 has a concave portion 131a and a convex portion 131b in the center to which the mold material 200 is fitted. The template 131 has an inclined shape with respect to a horizontal plane. The mold material is deformed into a shape denoted by reference numeral 200a by the template 131.

Figure 13:
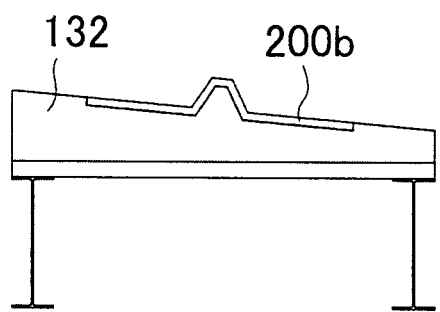
FIG. 13 is an explanatory view of the template.
Figure 14:
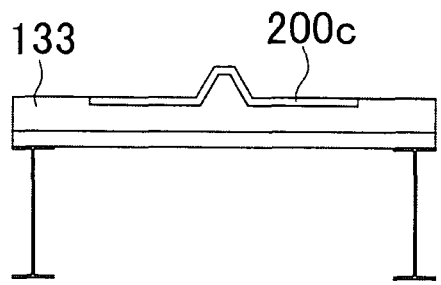
FIG. 14 is an explanatory view of the template.
Figure 15:
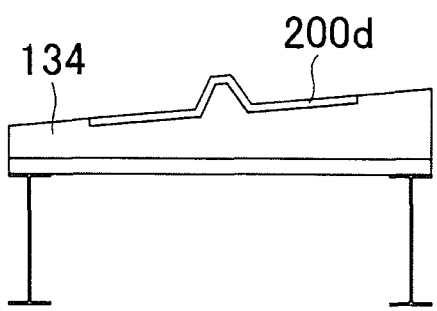
FIG. 15 is an explanatory view of the template.
Figure 16:
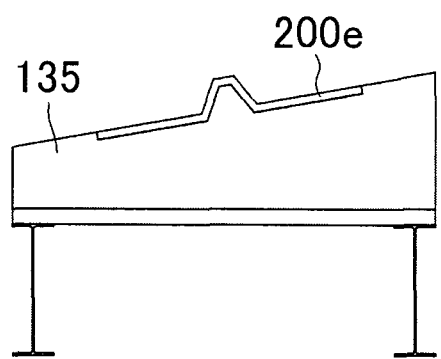
FIG. 16 is an explanatory view of the template.

FIG. 13 shows the configuration of the template 132 arranged at a section B-B in FIG. 11. The template 133 at a section C-C in FIG. 11, the template 134 at a section D-D, and the template 135 at a section E-E have the same configuration as shown in FIGS. 14 to 16.

A curved surface formed by sequentially connecting the templates 131, 132, 133, 134 and 135 has a three-dimensional shape.

When the semi-cured mold material 200 is mounted on the templates, the mold material 200 is deformed into a three-dimensional shape. The molding apparatus 100 is heated in an autoclave or an oven in the above state. The mold material 200 is thereby completely cured, so that a three-dimensional mold 210 can be obtained.

Figure 17:
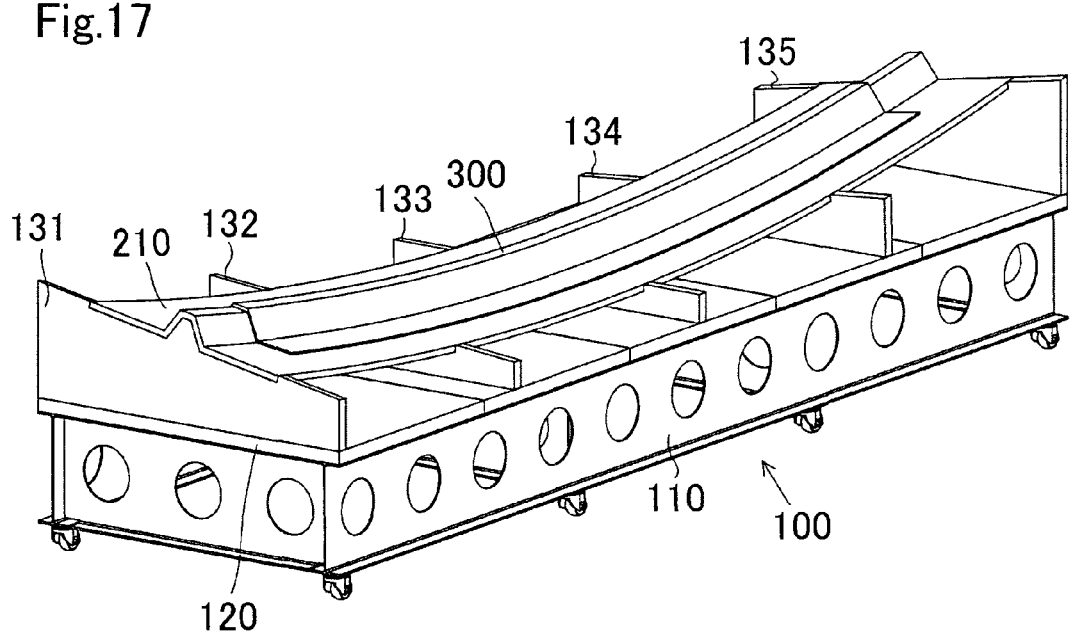
FIG. 17 is an explanatory view illustrating a state in which a prepreg is laminated on the three-dimensional mold.
Figure 18:
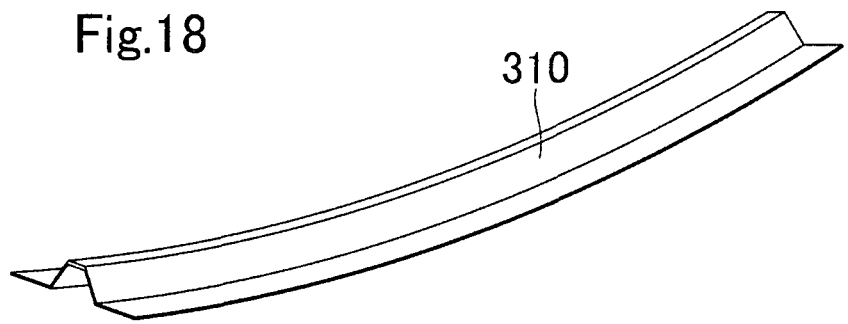
FIG. 18 is an explanatory view illustrating a three-dimensional molded article having a curve and a twist.

In a next process shown in FIG. 17, the mold 210 produced in the above method is mounted on the molding apparatus 100, and a prepreg sheet 300 is laid-up on the mold 210. The molding apparatus 100 is heated in an autoclave or an oven to obtain a composite material molded article 310 having a shape corresponding to the mold 210 as shown in FIG. 18.

FIGS. 19 to 24 show other embodiments of the present invention.

Figure 19:
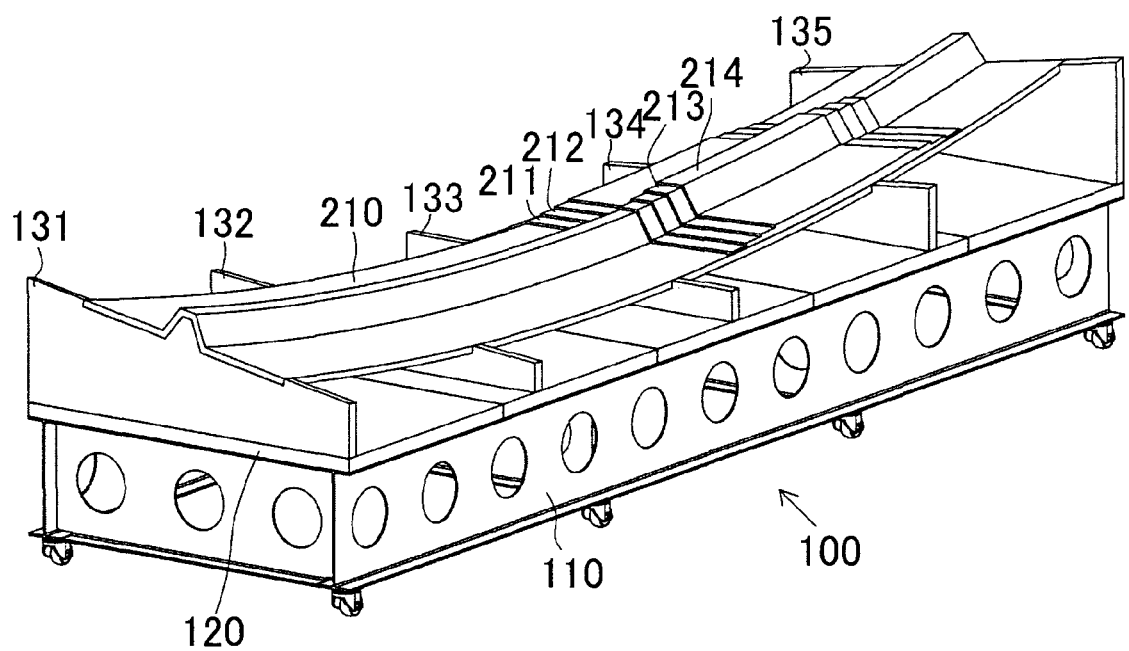
FIG. 19 is an explanatory view illustrating a state in which a prepreg sheet is additionally laminated on a portion to obtain a joggle shape.

As shown in FIG. 19, a required number of prepreg sheets 211, 212, 213, and 214 are additionally laminated on a portion of the completely-cured mold 210 produced in the above embodiment to form a required joggle portion.

Figure 20:
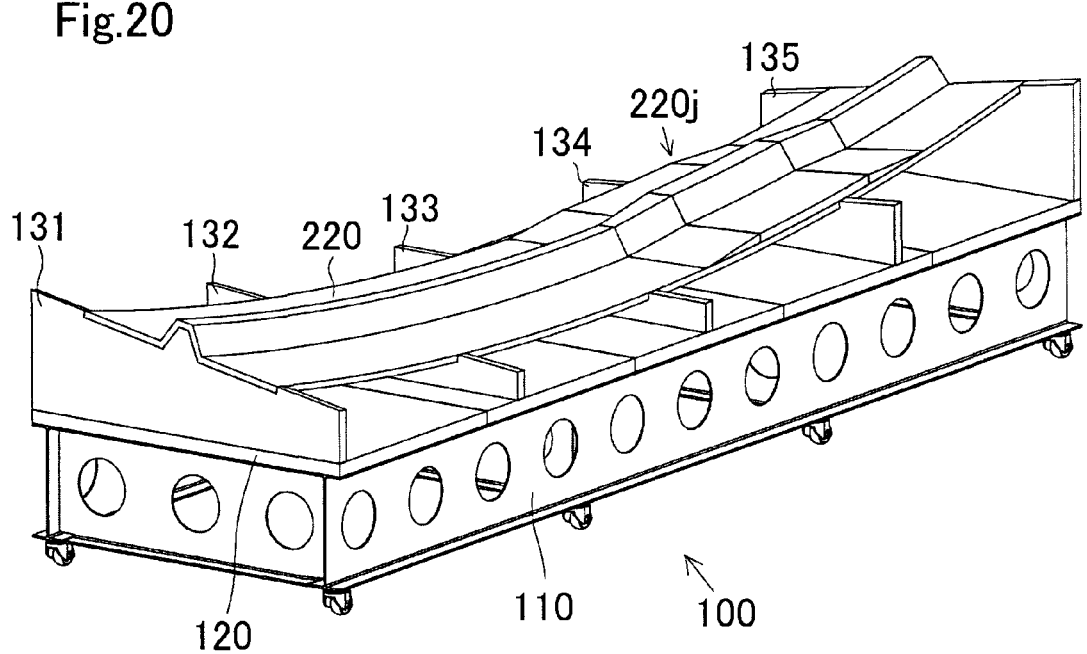
FIG. 20 is an explanatory view illustrating a state in which mechanical processing is performed after the additional lamination, and curing by an autoclave to obtain the joggle shape.

The entire molding apparatus 100 is then pressurized and heated in an autoclave, so that a mold 220 can be obtained. If necessary, mechanical processing is applied to a peripheral portion of the additionally laminated prepregs to eliminate a step. A mold having a smooth joggle portion 220j can be thereby obtained (FIG. 20).

Figure 21:
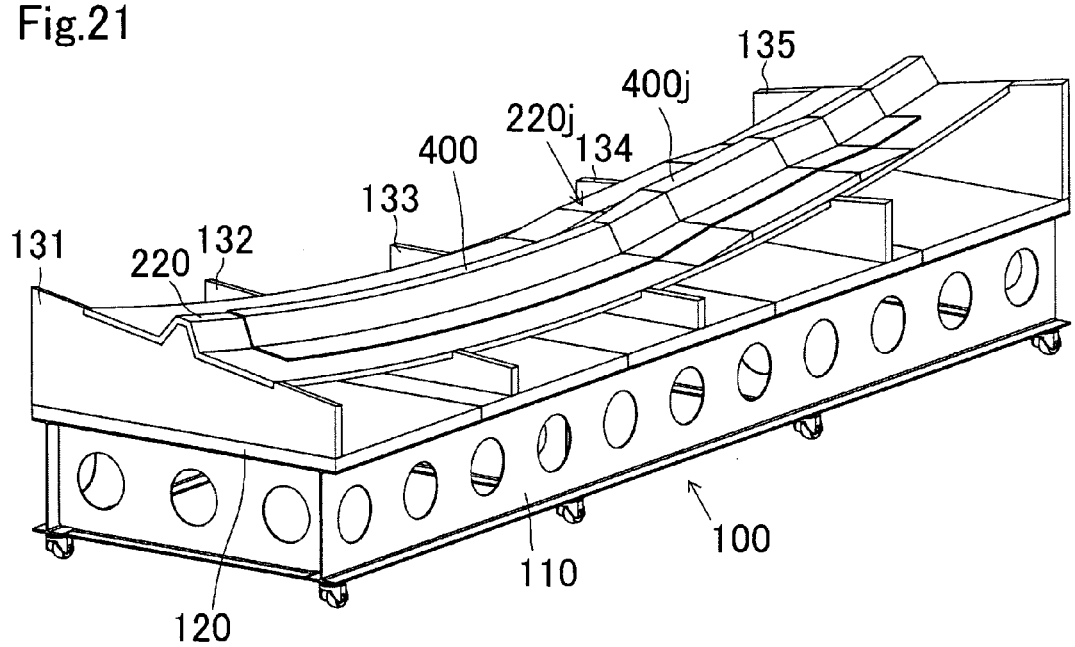
FIG. 21 is an explanatory view illustrating a state in which a prepreg is laminated on the mold having the joggle shape.
Figure 22:
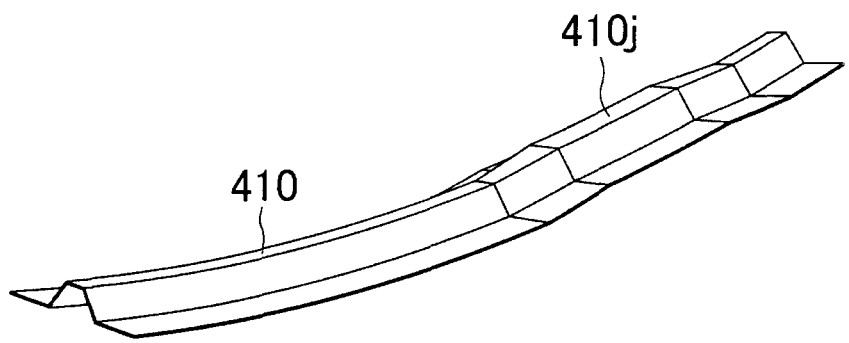
FIG. 22 is an explanatory view illustrating a molded article having a joggle shape.

As shown in FIG. 21, a prepreg sheet 400 is laid-up on the mold 220 to form a joggle portion 400j. The molding apparatus 100 is pressurized and heated. A long composite material molded article 410 having a three-dimensional shape and having a joggle portion 410j can be thereby obtained as shown in FIG. 22.

Figure 23:
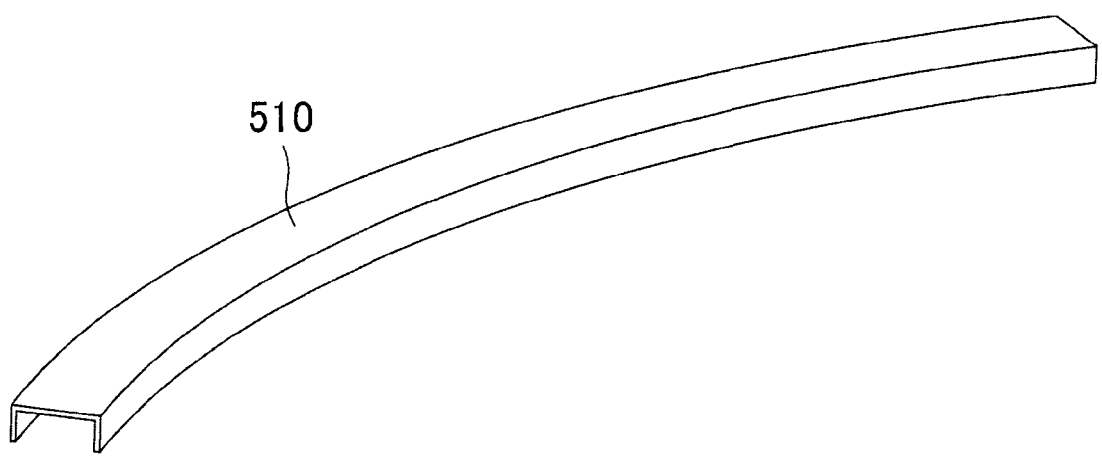
FIG. 23 is an explanatory view illustrating a molded article having a C shape in section and curved in a horizontal direction.

FIG. 23 is an explanatory view illustrating a molded article 510 having a C shape in section and curved in a horizontal direction by the mold produced in the present invention.

Figure 24:
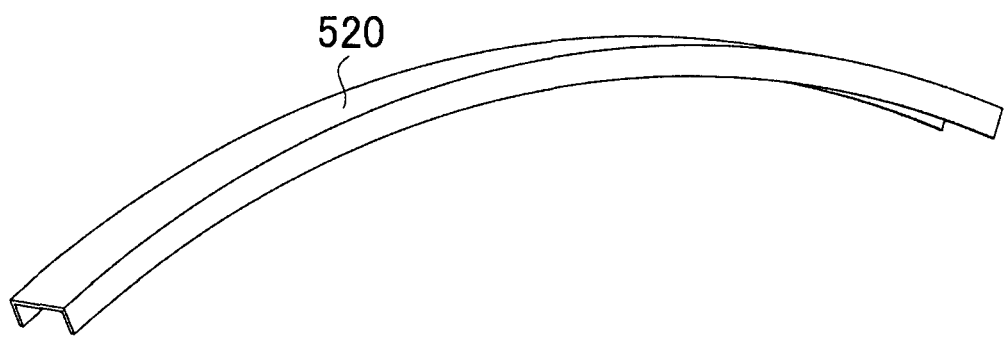
FIG. 24 is an explanatory view illustrating a molded article having a C shape in section and curved in a vertical direction.

FIG. 24 is an explanatory view illustrating a molded article 520 having a C shape in section and curved in a vertical direction by the mold produced in the present invention.

Figure 25:
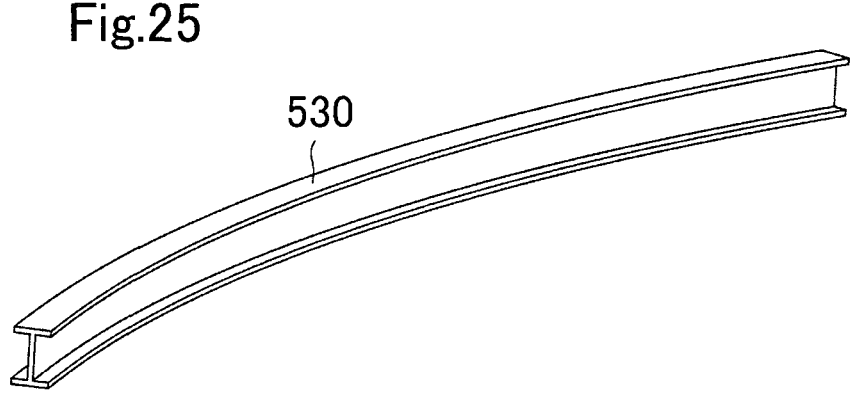
FIG. 25 is an explanatory view illustrating a molded article having an H or I shape in section and curved in the horizontal direction.

FIG. 25 is an explanatory view illustrating a molded article 530 having an H or I shape in section and curved in the horizontal direction by the mold produced in the present invention.

Figure 26:
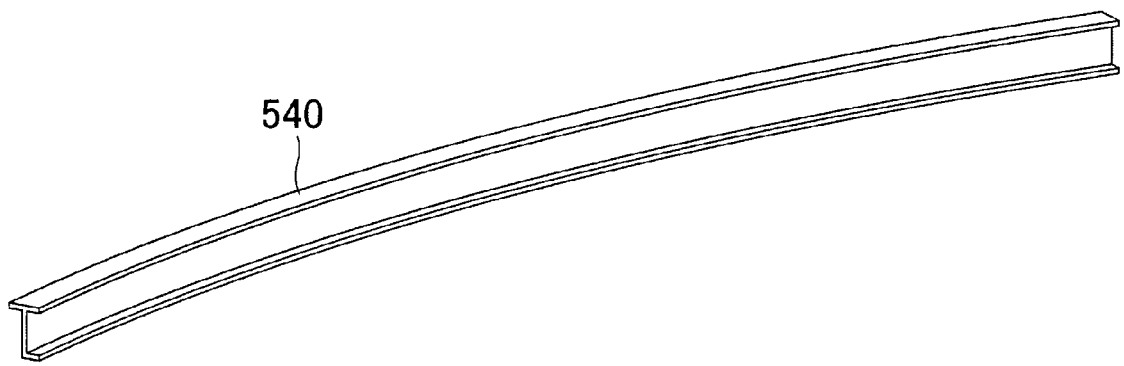
FIG. 26 is an explanatory view illustrating a molded article having a J shape in section and curved in the horizontal direction.

FIG. 26 is an explanatory view illustrating a molded article 540 having a J shape in section and curved in the horizontal direction by the mold produced in the present invention.

Figure 27:
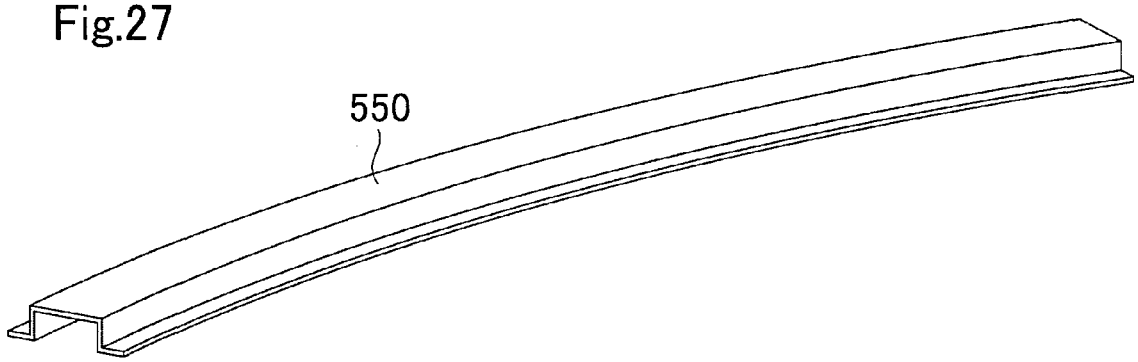
FIG. 27 is an explanatory view illustrating a molded article having a hat shape in section and curved in the horizontal direction.

FIG. 27 is an explanatory view illustrating a molded article 550 having a hat shape in section and curved in the horizontal direction by the mold produced in the present invention.

In the present invention, the prepreg material is processed into the two-dimensional long member in a semi-cured state by the pultrusion method as described above.

Subsequently, the semi-cured member is mounted on the templates or the like, and thereby plastically deformed into the three-dimensional member. The semi-cured member is completely cured by heating and pressurization.

The member produced through the above processes is used as the mold, so that the composite material molded article having a three-dimensional shape can be easily formed.

What is claimed is:

1. A method for producing a composite material mold for a composite material long member, comprising the steps of:
   molding a material of a mold having a two-dimensional shape and in a semi-cured state by causing a material obtained by overlapping a required number of prepreg sheets in which a composite material such as carbon fiber is impregnated with thermosetting resin to continuously pass through a hot press and a heat curing oven while applying a tension to the material;
   plastically deforming the mold material into a three-dimensional shape by mounting the mold material in a semi-cured state on a plurality of templates vertically provided on a base plate of a molding apparatus at an interval;
   completely curing the mold material in a semi-cured state by heating and pressurizing the molding apparatus on which the mold material deformed into a three-dimensional shape is mounted;
   forming a joggle portion partially having a different shape in section by laminating a required number of prepreg sheets on a portion of a surface of the completely-cured mold material; and
   completely curing the mold material where the joggle portion is formed by heating and pressurization.

* * * * *